United States Patent Office 3,043,956
Patented July 10, 1962

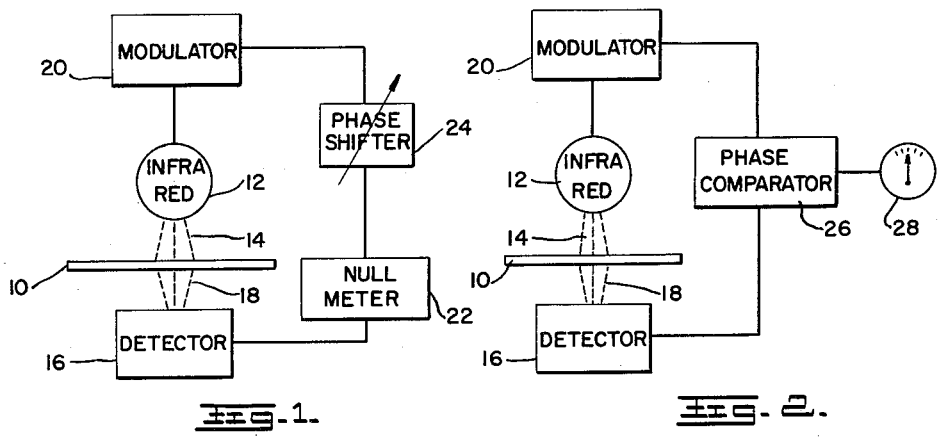
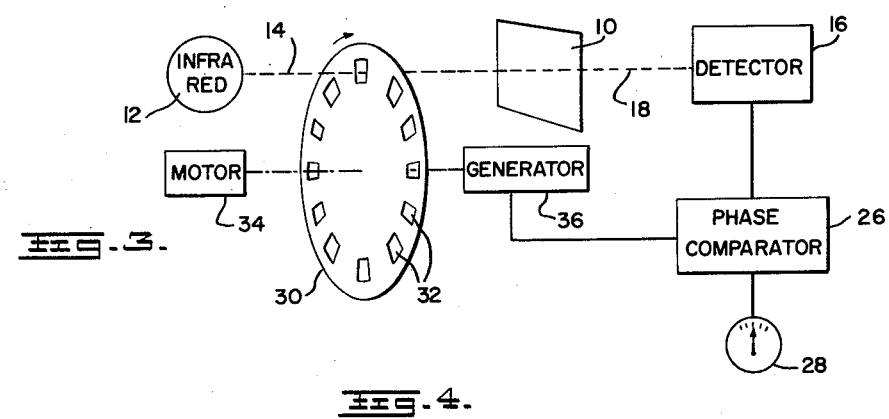
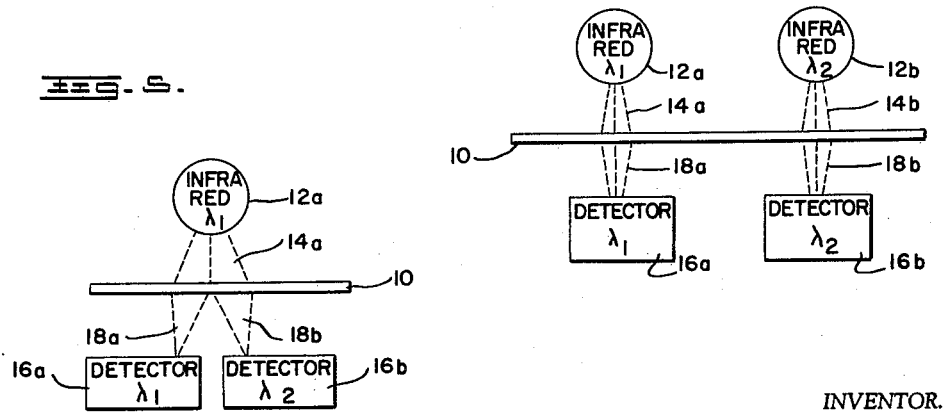
INVENTOR.
MARTIN J. COHEN
BY
ATTORNEY

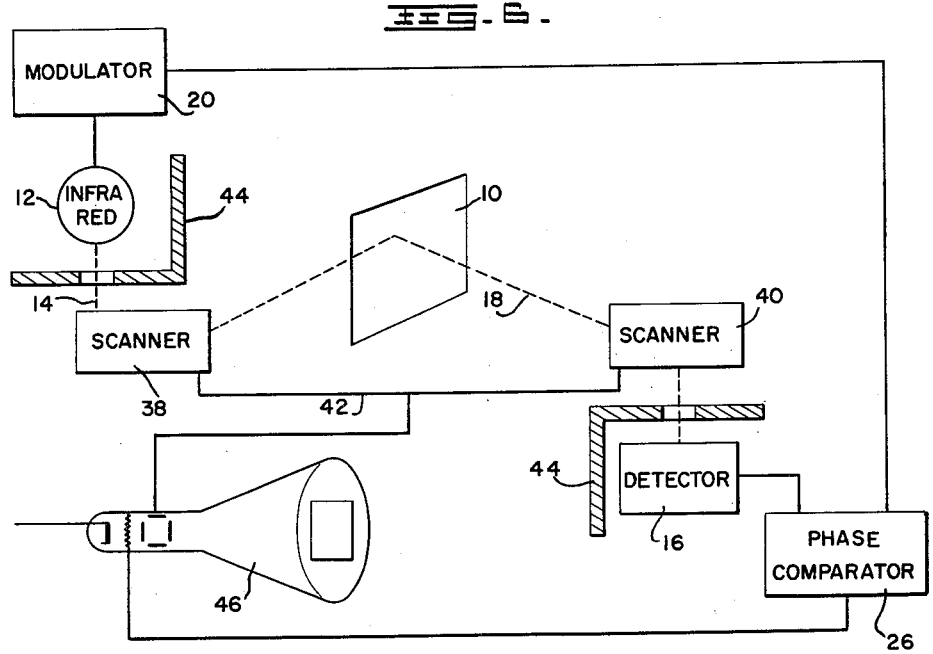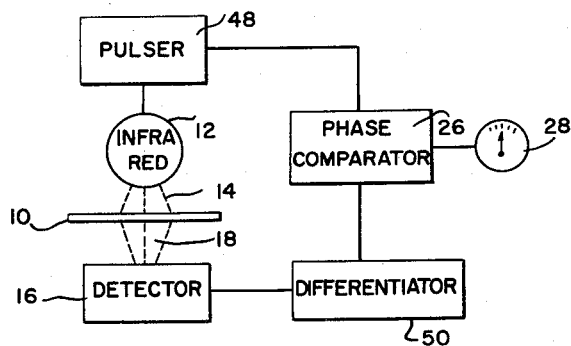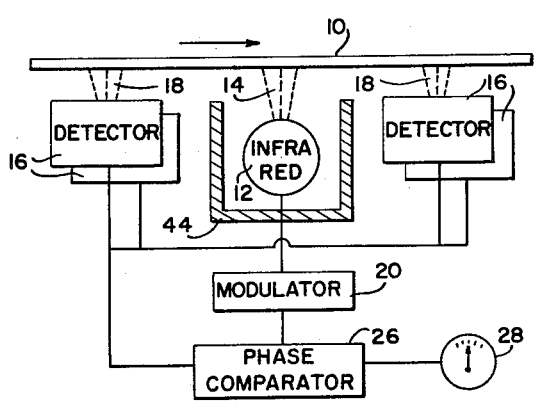

3,043,956
MEASURING SYSTEMS USING INFRA-RED RADIATION
Martin J. Cohen, King-of-Prussia, Pa., assignor to Franklin Systems, Inc., West Palm Beach, Fla., a corporation of Florida
Filed Sept. 24, 1958, Ser. No. 763,133
17 Claims. (Cl. 250—83.3)

This invention relates to measuring systems using infra-red radiation, and more particularly is concerned with the testing of materials by subjecting them to modulated infra-red radiation.

The infra-red spectrometer is an instrument which analyzes materials by determining as a function of wave length the decrease in amplitude of an incident beam of infra-red radiation. The decrease is a function of the thickness (and other characteristics) of the material placed in the beam and may be compared with the decrease in amplitude caused by passing the beam through a standard material. The measurements made by a conventional infra-red spectrometer, being a function of the amplitude of the radiation, are affected by fluctuations in the source amplitude as well as by the emissivity properties of the material under test. The present invention provides measurements which may be made independent of such variables. It is accordingly a principal object of the invention to provide novel systems for infra-red measurement.

Another object of the invention is to provide novel measurements of the foregoing type which are based upon phase change for time delay, rather than amplitude variation.

A further object of the invention is to provide novel systems for determining the characteristics of materials.

Yet another object of the invention is to provide novel systems for determining the thickness of materials.

Still another object of the invention is to provide novel systems for analyzing materials, including gases, liquids, and solids.

A still further object of the invention is to provide novel systems for determining the existence of and location of faults or flaws in materials.

An additional object of the invention is to provide novel systems for making plural wave length infra-red measurements.

A still further object of the invention is to provide novel systems for providing a two-dimensional display of the thermal impedance of an object.

The foregoing and other objects, advantages, and features of the invention and the manner in which the same are accomplished will become more readily apparent upon consideration of the following detailed description of the invention when taken in conjunction with the accompanying drawings, which illustrate preferred and exemplary embodiments and wherein:

FIGURE 1 is a block diagram of a first form of the invention;

FIGURE 2 is a block diagram of a second form of the invention, illustrating a modified type of phase measurement;

FIGURE 3 is a block diagram of a system similar to that of FIGURE 2 in its phase measurement but differing as to the method of modulation;

FIGURE 4 is a block diagram illustrating the use of the invention with plural wave length sources;

FIGURE 5 is a block diagram illustrating the use of the invention with a single wave length source and plural wave length detectors;

FIGURE 6 is a block diagram illustrating a form of the invention which utilizes scanning;

FIGURE 7 is a block diagram of a modified form of the invention using a pulser and a differentiator;

FIGURE 8 is a block diagram of still another form of the invention in which the source and the detectors are on the same side of the object being tested.

Briefly stated, the systems of the invention are based upon the measurement of the phase change or time delay of detected radiation from an object with reference to infra-red radiation impinging upon an object. The phase change or time delay is a function of the thermal impedance of the material under test, and the thermal impedance is a measure of the thickness, or other characteristics of the material.

Referring to the drawings, FIGURE 1 illustrates the application of the invention to the measurement of a characteristic of an object 10, which may be a solid, or a liquid or gas held within a suitable infra-red transparent container. Typically, the object 10 may be a sheet of solid material up to 0.1 inch thick, for example, and the invention may be used to measure the thickness of the object material. In the form shown, a source 12 of infra-red radiation 14 is adjacent one side of the object, and an infra-red detector 16 for detecting infra-red radiation 18 from the object is arranged on the other side. The infra-red source 12 is broadly a source of thermal energy, such as a heated tungsten element, and is modulated at a rate of say 100 times per second by a modulator 20. The modulator may assume any conventional form, such as a simple electrical or mechanical switch for varying the supply of electrical power to energize the infra-red source. The resolution of the system is dependent upon the width of the beam 14 emanating from the source 12, and a suitable optical system (not shown) may be employed to maintain the desired beam width, for example, about ⅛ inch.

When the object 10 is irradiated by the beam 14, the temperature on the face of the object adjacent source 12 will rise and fall with the modulation of the beam 14. The temperature on the opposite side of the object 10, that is the side adjacent the detector 16, will also rise and fall but with a phase shift or time delay with respect to the temperature on the source side. This time delay may range from $10^{-5}$ to $10^{-1}$ seconds, depending upon the material. The time delay or phase shift has been found to be a function of the thickness of the material 10.

The effectiveness of the measurements performed by the invention depends upon the type of detector 16 employed, and for optimum results the thermal detector 16 should have a short response time and a long wave length sensitivity. Detectors such as those comprising lead sulfide or selenide or special germanium units are well suited to the invention. The measurement of thickness is made rapidly during the initial exposure of the material 10 to the beam, before the material heats to a temperature of says 100° C.

In the embodiment shown in FIGURE 1, the output of the detector 16, which is an amplitude modulated electrical signal, is applied to a null meter 22 which also receives an amplitude modulated electrical signal from the modulator 20 passed through an adjustable phase shifter 24. The outputs of the modulator and detector may be electrical voltages which are synchronized, respectively, with the modulation of the impinging beam 14 and the beam 18 received by the detector. The null meter may be any type of device for balancing one input against another and giving an indication when a balance is obtained. For example, a bridge circuit may be used. In performing the measurements of the invention, the phase shifter 24 is adjusted until a null is obtained on the meter 22, and the adjustable element of the phase shifter may be calibrated to indicate the amount of phase shift required to obtain the null in terms of thickness of the material 10. The terms "phase shift" and "time delay" are used interchangeably for the purposes of the invention, and hence the phase shifter 24 may comprise a delay line, for example.

FIGURE 2 illustrates an embodiment of the invention similar to FIGURE 1 but having a different means of phase or time comparison. The reference numerals common to FIGURES 1 and 2 designate the same part in both figures. In the embodiment of FIGURE 2 the output of the modulator and the output of the detector are applied to a phase comparator 26 having a meter 28, and instead of balancing one output against the other to obtain a null as in FIGURE 1, the phase comparator simply indicates the relative phase or time difference between the outputs of the modulator and the detector.

FIGURE 3 illustrates the use of a different form of modulator. In this form the source 12 produces a beam 14 of constant amplitude which is modulated by a perforated disc 30 interposed in the beam, a circumferential row of perforations 32 being shown. The disc is driven by a motor 34 and will be recognized as a common form of light chopper. As the disc is rotated it interrupts or varies the intensity of the beam 14 impinging on the object 10, but insofar as the detector 16 is concerned, the effect is the same whether the source 12 generates a varying amplitude beam or a constant amplitude beam that is varied. Motor 34 also drives an A.C. generator 36, the output of which is applied to the phase comparator 26 along with the output of the detector 16. The voltage wave of the generator 36 is synchronized with the variation of the amplitude of the impinging beam 14, and the difference in phase between this wave and the modulation wave at the output of the detector is a function of the thickness of the material 10.

It should be apparent that the light chopper 30 is representative of any of the many conventional devices which are suitable for modulating infra-red radiation, and that the phase or time difference measurement of FIGURE 3 is illustrative of both the schemes illustrated in FIGURES 1 and 2 and of other conventional schemes for measuring phase or time difference.

The invention is useful not only in determining object thickness but also in performing other types of analysis, such as determining molecular relaxation times or internal energy transfer, both of which characteristics are important when chemical structure or identification is of interest. The invention may also be employed to determine the existence of and to locate internal flaws or faults, as in laminated or bonded materials. For example, a silver-iron alloy sandwich with a poor joint which is an oxide or gas interface will have a difference in thermal delay, as compared to a standard good joint, of $10^{-2}$ to $10^{-5}$ seconds depending upon the thickness of the defective layer. Since infra-red detectors with a time constant of as low as $2 \times 10^{-6}$ seconds exist (such as cooled indium antimonide) very thin defects of the order of $10^{-5}$ inches are capable of detection.

For many such analyses it is desirable to irradiate the material by infra-red energy at plural wave lengths and to make measurements at such wave lengths.

FIGURE 4 illustrates the application of the invention to a system employing infra-red radiation at plural wave lengths. In the illustrative form shown two sources are employed, one designated 12a generating infra-red at a first wave length $\lambda_1$ and a second 12b generating infra-red at a second wave length $\lambda_2$. Each wave length has its own detector 16a and 16b, respectively, for detecting radiation 18a and 18b. The components of FIGURE 4 are associated with suitable modulators and phase difference measuring apparatus so that the phase difference or time delay between the modulation of the beams 14a and 18a and between the beams 14b and 18b may be determined. The measurements may be made in accordance with the teachings of any of FIGURES 1–3, but measurements are made at each wave length.

The system of FIGURE 4 is merely illustrative, and for certain applications of the invention, as in spectrometry, the use of a greater number of wave lengths is desirable. Radiation at the desired wave length may be obtained from a wide band source of infra-red radiation that is selectively filtered or from plural narrow band sources.

FIGURE 5 illustrates an application of the invention wherein the incident infra-red radiation causes the generation of radiation at a different wave length. The object 10 is stimulated by the incident infra-red radiation at a first wave length $\lambda_1$, to generate radiation at a second wave length $\lambda_2$. The latter radiation is designated 18b and is detected by the detector 16b, radiation from the object 10 at the wave length of the incident radiation being shown at 18a and detected by detector 16a. Here again the source of infra-red radiation is suitably modulated, and the modulation of the incident beam is compared with the modulations of the detected beams, respectively, to determine the respective phase shifts or time delays.

The rapid measurements obtained by the invention permit the use of a scanning technique to produce a two-dimensional visual presentation of a large area of material. Such a system may be employed to determine variations in thickness over the area or to detect and locate flaws of the material within the scanned area.

FIGURE 6 illustrates the scanning technique. In this figure, a source 12 of infra-red energy is modulated by a modulator 20 to produce a varying amplitude beam 14 that is moved across one surface of an object 10 by a scanner 38. The scanner may be of the type which produces orthogonal movement along $x$ and $y$ coordinates and may comprise suitable oscillating or rotating mirrors, as is well known in the art of scanners. Another scanner 40, on the opposite side of the object 10, is synchronized with scanner 38, as indicated by the connection 42 and directs the received beam 18 to detector 16 throughout the movement of the incident and the received beams. Suitable shielding as indicated at 44 may be employed to isolate the source 12 from the detector 16, except for the desired beam transmission between the two. The output of the modulator is applied to a phase comparator 26 along with the output of the detector 16, and the output of the phase comparator is a variable amplitude function of the phase difference or time delay between the incident and detected modulation during the scan. This function may be applied in the form of a variable amplitude voltage to a control element of a display device, such as the cathode ray oscilloscope 46. The intensity of the electron beam of the oscilloscope will then vary with the output of the phase comparator. The deflection of the beam is controlled by suitable control potentials obtained from the scanners, such as position take-off potentiometers, to sweep the electron beam across the screen of the cathode ray tube in synchronism with the movement of the beam of infra-red radiation. A two-dimensional visual presentation will then be obtained on the screen of the cathode ray tube in accordance with the thermal impedance of the object 10 at successive points along the scan. Internal flaws which cause variations in thermal impedance will be clearly visible by corresponding variations in the intensity of the light from the screen with respect to flawless areas, which serve as a standard of comparison. By virtue of this scanning technique, a relatively large area of the object 10 may be quickly analyzed. For example, if an area of $\frac{1}{16}$ of a square inch is scanned in .01 second, approximately 6 square inches will be scanned in 1 second, or 2½ square feet per minute.

FIGURE 7 illustrates another embodiment of the invention whereby extremely rapid measurements are obtained. This system of the invention uses a transient technique. A pulser 48 is employed to modulate the infra-red source 12, and the output of the detector 16 is applied to a differentiator 50, the output of which is compared with the output of the pulser 48 in a phase comparator 26. If the pulser 48 is energized to produce a pulse of infra-red radiation, a corresponding but delayed pulse will be produced in the detector 16, and the leading edge of the detected pulse may be obtained from the differentiator 50 and compared with the time or phase of the initial pulse from the pulser 48 to obtain a quick measurement of the thickness of the object 10, or any other characteristic causing a thermal time delay. This system is especially adaptable to the testing of large areas and may be used in a scanning technique like that of FIGURE 6.

The principles of the invention are also applicable to measurements made from the same side of an object and to a moving object, such as a moving web. In the embodiment of FIGURE 8, the modulated infra-red beam 14 irradiates an object 10, which may be moving as indicated by the arrow. Detectors 16 are arranged on the same side of the object 10 as the source 12 but are shielded from the source by shielding 44. To make the measurements substantially independent of the movement of the object 10 the detectors 16 are arranged in groups symmetrically on opposite sides of the source 12, and each group has a plurality of detectors arranged transversely to the direction of movement of the object. The outputs of the detectors are combined, so that an average output is obtained, and the combined output is applied to the phase comparator 26 along with a signal from the modulator 20 as before. To obtain accurate measurements, the rate of movement of the object 10 should be small compared to the rate at which measurements are made. Thus, the source-detector spacing should be small compared to the distance traveled by the object 10 in the time necessary to achieve a measurement. The beam width should also be kept small and the modulation rate low. When the determinative parameters are known, the meter 28 of the phase comparator may be calibrated in terms of the material characteristic of interest, as before.

It will be apparent from the foregoing description that the invention provides measurements which may be made independent of random or ambient variations of source amplitude and which may be made independent of the emissivity properties of the materials under test. These characteristics of the invention permit new types of measurements and render older types of measurements more accurate, at the same time eliminating difficulties and simplifying the equipment used in previous measurements.

The foregoing embodiments are representative of many other applications of the principles of the invention. For example, measurements may be made at several wave lengths simultaneously while scanning at a predetermined rate. Measurements may be made of both direct and scattered radiation at the same or different wave lengths. Materials may be analyzed which are visually transparent but which are relatively opaque at certain wave lengths of infra-red. The invention may be used in industrial control for maintaining constant thickness of material or other material characteristics or for inspecting and sorting materials, for example. In the making of semi-conductors the invention may be employed to sense the presence of impurities.

Typical heat sources which may be employed in the invention are a Nerst glower, a heated silicon carbide "Glowbar," a heated tungsten wire with a quartz window, a steam jet, a zirconium arc, or a xenon flash lamp. The last two are capable of rapid electrical modulation.

Within its broader aspects, the invention may be applied to systems in which heat is withdrawn from an object rather than supplied to the object. For example, if a Freon jet is placed adjacent to one side of an object and suitably modulated or variably exposed to the object, a corresponding temperature variation will occur on the opposite side of the object, and the difference in phase between the variations on the respective sides of the object may be measured as previously described.

The invention is applicable to materials with poor or good thermal conductivity, for example, rubber or dielectric sheets, steel plate, or aluminum foil.

As noted previously, portions of the various embodiments shown and described may be interchanged, as for example the type of modulation, and the type of phase or time delay measurement. Scanning techniques may be employed with different types of modulation and phase comparison, and a cathode ray oscilloscope may be employed to measure phase as well as to give a two-dimensional display. The modulator may be chosen to produce sine waves, rectangular pulse waves, or other types of wave forms. Plural wave length radiation, induced radiation, or scattered radiation may also be employed in many different applications of the invention.

Thus, while preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. Apparatus of the type described, comprising a source of modulated infra-red radiation, an object irradiated by said radiation, an infra-red radiation detector receiving radiation from said object in response to the radiation of said object by said source, and means for measuring the difference in phase between the modulation of the radiation from said source and the modulation of the radiation received by said detector.

2. The invention of claim 1, said source being a source of infra-red radiation of different wave lengths, said detector comprising means responsive to said wave lengths, respectively.

3. The invention of claim 1, said source and said detector being located on opposite sides of said object.

4. The invention of claim 1, said source and said detector being located on the same side of said object, said detector being shielded from said source.

5. The invention of claim 1, said detector having plural detector means, the outputs of which are combined.

6. Apparatus of the type described, comprising a source of infra-red radiation, modulator means for modulating the radiation from said source, an object irradiated by the radiation from said source, an infra-red radiation detector receiving infra-red radiation from said object in response to the irradiation of said object by said source, and means for measuring the difference in phase between the modulation from said modulator means and the modulation of the detected radiation.

7. The invention of claim 6, said modulator means comprising means for varying the generation of said infra-red radiation by said source.

8. The invention of claim 6, said modulator means comprising means for variably passing the infra-red radiation from said source.

9. The invention of claim 6, said modulator means comprising a pulser.

10. The invention of claim 9, said detector having an output connected to a differentiator, the output of which is connected to said phase measuring means for comparison with the output of said pulser.

11. Apparatus of the type described, comprising a source of modulated infra-red radiation at a first wave length, an object irradiated by said radiation, a detector receiving radiation from said object at a second wave length in response to irradiation thereof by said radiation at said first wave length, means for comparing the phase of the modulation of said radiation at said first and second wave lengths and for producing an output which varies as a function of the difference in phase.

12. Apparatus of the type described, comprising a source of modulated beam of infra-red radiation, an object, means for scanning said beam over said object, means for receiving infra-red radiation from said object in response to the scanning radiation, and means for comparing the phase of the modulation of the radiation from said source and the radiation from said receiving means and for producing an output which is a function of the phase difference at successive instants during said scanning.

13. The invention of claim 12, further comprising means for displaying said output visually.

14. Apparatus of the type described, comprising an object, modulated means for causing a variation in the temperature of said object, detector means for detecting said variation in temperature, means for comparing the phase of the modulation of the first mentioned means and the modulation detected by said detector and for producing an output which varies as a function of the difference in phase.

15. Apparatus for determining a characteristic of a sample, which comprises means for irradiating said sample with modulated radiant energy to cause said sample to emit energy in response to the irradiation, and means for comparing the phase of the emitted energy with the irradiating energy, and producing an output which varies as a function of the difference in phase.

16. The apparatus of claim 15, said modulated energy being pulsed.

17. Apparatus of the type described, comprising an object, means for causing a transient variation in the temperature of a first portion of the object, means for detecting a transient variation in the temperature of a second portion of the object induced by the first variation after an interval of time representative of the properties of said object, and means for determining said interval of time.

References Cited in the file of this patent
UNITED STATES PATENTS

| | | |
|---|---|---|
| 2,393,631 | Harrison | Jan. 29, 1946 |
| 2,679,184 | Atwood | May 25, 1954 |
| 2,856,531 | Brouwer | Oct. 14, 1958 |
| 2,879,401 | Chicurel | Mar. 24, 1959 |
| 2,930,893 | Carpenter et al. | Mar. 29, 1960 |